US008804655B2

(12) United States Patent
Rue (10) Patent No.: US 8,804,655 B2
(45) Date of Patent: Aug. 12, 2014

(54) WIRELESS LAN NETWORK, AND MOBILE STATION, BASE STATION AND METHOD OF CONTROLLING HANDOFF IN WIRELESS LAN NETWORK TO PREVENT PACKET LOSS DURING HANDOFF

(75) Inventor: Seon-Soo Rue, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1744 days.

(21) Appl. No.: 12/068,226

(22) Filed: Feb. 4, 2008

(65) Prior Publication Data

US 2008/0192698 A1  Aug. 14, 2008

(30) Foreign Application Priority Data

Feb. 12, 2007 (KR) .................. 10-2007-0014298

(51) Int. Cl.
*H04W 4/00* (2009.01)
*H04J 1/00* (2006.01)

(52) U.S. Cl.
USPC ........... 370/331; 370/328; 370/329; 370/334; 370/489

(58) Field of Classification Search
USPC .......... 730/331, 328, 329, 334, 489; 455/430, 455/436, 439, 432; 370/331, 328, 329, 334, 370/489
See application file for complete search history.

(56) References Cited

U.S. PATENT DOCUMENTS

| | | | |
|---|---|---|---|
| 5,991,287 A * | 11/1999 | Diepstraten et al. .......... | 370/338 |
| 2003/0128163 A1 | 7/2003 | Mizugaki et al. | |
| 2004/0264397 A1 | 12/2004 | Benveniste | |
| 2005/0259612 A1 | 11/2005 | Yarlagadda | |
| 2005/0288022 A1* | 12/2005 | Ryu et al. ....................... | 455/439 |
| 2007/0104179 A1* | 5/2007 | Srinivasan et al. ............ | 370/351 |
| 2007/0183383 A1* | 8/2007 | Bitran et al. .................. | 370/338 |
| 2008/0096560 A1* | 4/2008 | Felske et al. .................. | 455/436 |

FOREIGN PATENT DOCUMENTS

| | | |
|---|---|---|
| EP | 0851631 | 7/1998 |
| EP | 01437868 | 7/2004 |

OTHER PUBLICATIONS

European Search Report dated Oct. 7, 2011 issued for related European Patent Application No. 08002033.2.
European Search Report dated May 26, 2011 for EP Application No. 08002033.2, which corresponds to U.S. Appl. No. 12/068,226.

* cited by examiner

*Primary Examiner* — Brandon Renner
*Assistant Examiner* — Abdelnabi Musa
(74) *Attorney, Agent, or Firm* — H.C. Park & Associates, PLC (57) ABSTRACT

Provided are a wireless local area network (LAN) network, a mobile station and a base station, and a method of controlling handoff in the wireless LAN network. The wireless LAN network includes a mobile station and a number of base stations. The mobile station notifies a previously connected first base station of an entry into a power-save mode, performs a handoff process with a second base station, and then notifies the first base station of an exit from the power-save mode. Each of the base stations buffers a packet to be transmitted from a public network to the mobile station when the each of the base station is notified of the entry into the power-save mode by the mobile station, and transmits the buffered packet to the mobile station when the each of the base station is notified of the exit from the power-save mode by the mobile station. This wireless LAN network system and method is capable of performing handoff without packet loss.

19 Claims, 8 Drawing Sheets

WIRELESS LAN NETWORK, AND MOBILE STATION, BASE STATION AND METHOD OF CONTROLLING HANDOFF IN WIRELESS LAN NETWORK TO PREVENT PACKET LOSS DURING HANDOFF

CLAIM OF PRIORITY

This application makes reference to, incorporates the same herein, and claims all benefits accruing under 35 U.S.C. §119 from an application for WIRELESS LAN NETWORK, AND MOBILE STATION, BASE STATION AND METHOD OF CONTROLLING HANDOFF IN WIRELESS LAN NETWORK earlier filed in the Korean Intellectual Property Office on the 12 Feb. 2007 and there duly assigned Serial No. 10-2007-0014298.

BACKGROUND OF THE INVENTION

1. Field of the Invention

The present invention relates to a wireless local area network (LAN) network, a mobile station and a base station, and a method of controlling handoff in the wireless LAN network.

2. Description of the Related Art

With the constant development of hardware technology, terminals have become small in size, and to achieve high performance. In combination with this achievement, wireless packet data networks enable users to obtain useful information regardless of time or space. This computing paradigm is based on core technology which allows a terminal to receive information regardless of its current location, that is, technology which allows portability of a terminal and wide-ranging mobility of a user. Thus, mobility-supporting technology generally designates a method used for tracking movement of a terminal between different hardware characteristic areas or different mobile communication networks, and mutually transmitting location information between network components if necessary.

Users of mobile stations must be provided with reliable and stable mobility-supporting technology so that they can enjoy a constant and useful computing environment while watching a multimedia presentation, surfing the Internet, sending email, and so on. In particular, in a wireless LAN environment transmitting data in high-speed, an improved mobility-supporting system together with a dynamic load balancing technique can maintain network connections while remote users pass through different access points.

Figure 1:
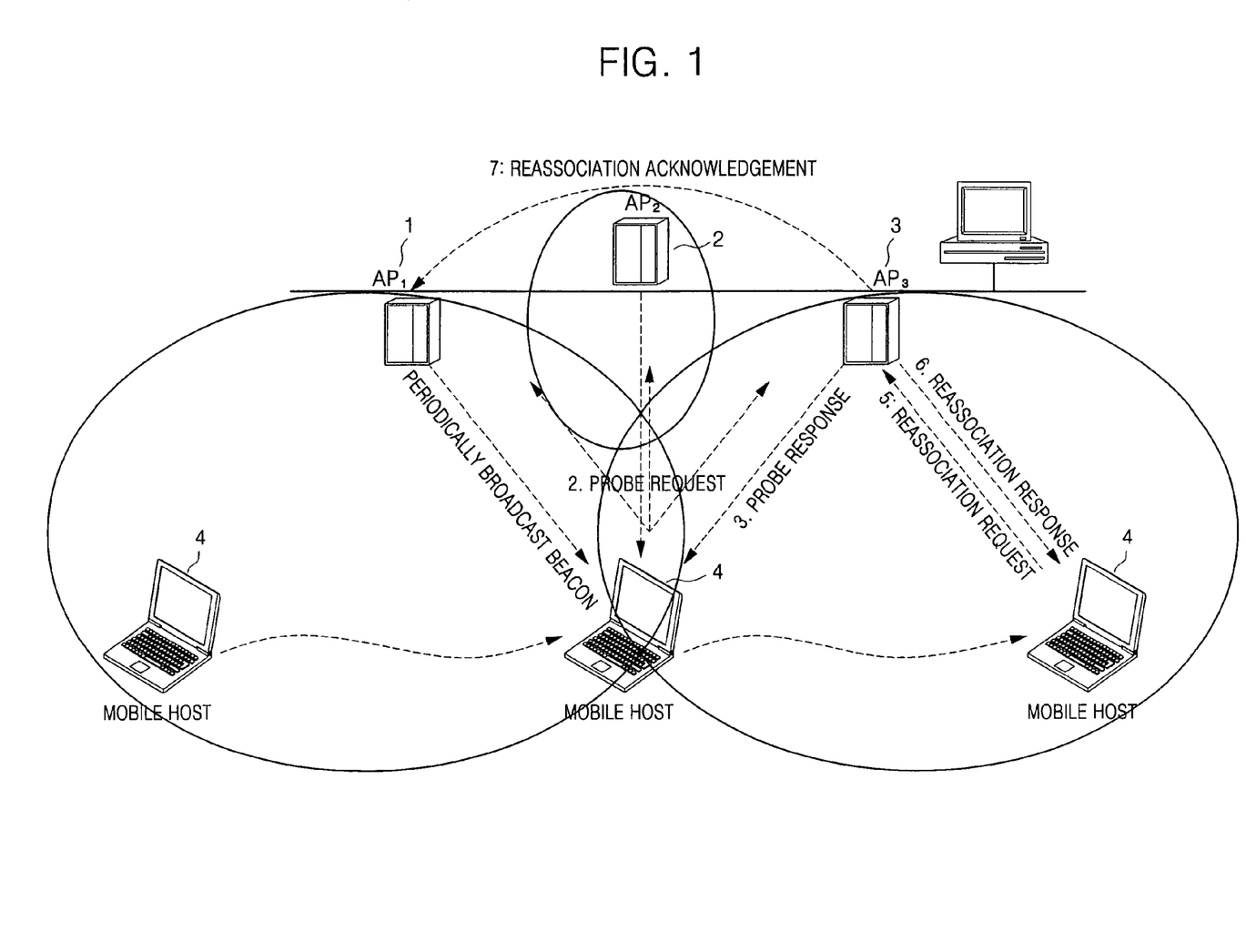
FIG. 1 illustrates a handoff process in a wireless local area network (LAN) network.

FIG. 1 illustrates a handoff process in a general wireless LAN network. Referring to FIG. 1, the general wireless LAN network may comprise a plurality of access points 1, 2 and 3 and a moving mobile host 4 that performs handoff process. The access points 1, 2 and 3 periodically broadcast beacon messages. The broadcasted beacon message includes information on the corresponding access points 1, 2 and 3, such as a time stamp, a capability, an extended service set (ESS) identification (ID) and a traffic indication map (TIM).

The mobile host 4 uses the information included in the beacon message to distinguish the different access points 1, 2 and 3 from each other. When a received signal strength (RSS) weakens, the moving mobile host 4 keeps a beacon message having a higher RSS as a beacon message of a current access point among the adjacent access points 1, 2 and 3.

In an active RSS scanning process, the mobile host 4 transmits a probe request to all the adjacent access points 1, 2 and 3. In response to the probe request, the each of access points 1, 2 and 3 transmits a probe response including periodically broadcasted beacon information.

The mobile host 4 selects the access point 3, for example, transmitting the probe response having the highest RSS to determine the access point 3 as a new access point, and transmits a reassociation request to the new access point 3. The message for the reassociation request includes information on the mobile host 4. The new access point 3 transmits a reassociation response including a supporting bit rate, a terminal ID and information required for restarting communication to the mobile host 4. Here, the previous access point 1 is notified of only the reassociation event, is not notified of a current location of the mobile station 4.

According to the above-described handoff process, since the mobile host 4 has closed (or terminated) a connection with the previous access point 1, packets are lost until a link with the access point 3 is established after movement. A time period, during which the mobile host 4 closes the connection to the previous access point 1, and establishes a link with the new access point 3, is referred to as an open period. In the open period, data transmission cannot be performed, thus resulting in data loss.

SUMMARY OF THE INVENTION

It is an object of the present invention to provide a wireless local area network (LAN) network, and a base station, a mobile station and a method of controlling handoff in the wireless LAN network, in which the mobile station notifies a base station connected before movement of entry into a power-save mode to control the base station to buffer a packet, performing handoff with another base station after movement, and then notifying the base station connected before movement of exit from the power-save mode to receive the buffered packet.

A first aspect of the present invention provides a wireless LAN network, comprising a plurality of base stations, and a mobile station. The mobile station notifies a first one of the base stations, which is currently connected to the mobile station, of an entry into a power save mode. The mobile station performs a handoff initiation process with a second one of the base stations to which the mobile station performs handoff. The mobile station notifies the first one of the base stations of an exit from the power save mode after completing the handoff initiation process. Each of the base stations buffers a packet that is to be transmitted to the mobile station through the each of the base stations whenever the each of the base stations is notified of an entry into a power save mode by the mobile station. Each of the base stations transmits the buffered packet to the mobile station whenever the each of the base stations is notified of an exit from the power save mode by the mobile station.

The mobile station may notify the first base station of the entry into the power-save mode using a null message, and may notify the first base station of the exit from the power-save mode using a power-save (PS) poll message or a trigger message of a Wireless Fidelity (WiFi) multimedia power-save (WMM PS) mode.

The mobile station may scan the base stations to search for the second one of the base stations during the handoff initiation process, and the mobile station establishes a new link with the second one of the base stations after completing the handoff initiation process. The mobile station may notify the second one of the base stations of an entry into the power save mode after establishing the new link with the second one of the base stations.

A second aspect of the present invention provides a method of controlling handoff in a wireless LAN network. The method comprises the steps of notifying a first base station of a first entry into a power save mode where the first base station is currently connected to a mobile station, buffering a first packet that is to be transmitted to the mobile station through the first base station in the first base station after the step of notifying the first base station of the first entry into the power save mode, performing at the mobile station a handoff initiation process to a second base station to which the mobile station performs handoff, notifying the first base station of a first exit from the power save mode after completing the handoff initiation process, and transmitting the first packet from the first base station to the mobile station.

The step of notifying the first base station of the first entry into the power save mode may include a step of transmitting a null message to the first base station. The step of notifying the first base station of the first exit from the power save mode may include a step of transmitting power save (PS) poll message or a trigger message of a Wireless Fidelity (WiFi) multimedia power save (WMM PS) mode to the first base station. The step of performing the handoff initiation process to a second base station may include a step of scanning base stations to search for the second base station to which the mobile station performs handoff.

The method may further comprise the steps of notifying the first base station of a second entry into a power save mode, buffering a second packet that is to be transmitted to the mobile station through the first base station in the first base station after the step of notifying the first base station of the second entry into the power save mode, establishing a new link with the second base station, notifying the second base station of an entry into a power save mode, after completing the establishment of the new link with the second base station, buffering a packet that is to be transmitted to the mobile station through the second base station in the second base station after the step of notifying the second base station of the entry into the power save mode, notifying the first base station of a second exit from the power save mode after the step of notifying the second base station of the entry into the power save mode, transmitting the second packet from the first base station to the mobile station, closing the connection with the first base station, notifying the second base station of an exit from the power save mode, and transmitting the packet buffered in the second base station from the second base station to the mobile station.

A third aspect of the present invention provides a base station in a wireless LAN network, comprising a packet determiner for determining whether a notification of an entry into or an exit from a power save mode is received from a mobile station that exists in an area managed by the base station, a buffering controller for controlling a packet, which is to be transmitted to the mobile station, to be buffered when the packet determiner is notified of the entry into the power save mode by the mobile station, and a releasing controller for releasing the buffered packet to the mobile station when the packet determiner is notified of the exit from the power save mode by the mobile station.

The packet determiner may determine that the mobile station notifies the base station of the entry into the power save mode whenever a null message is received from the mobile station. The buffering controller may check an Internet Protocol (IP) address of the mobile station transmitting the null message, and buffers a packet having the same IP address as a destination IP address of the mobile station among packets transmitted from a public network.

The packet determiner may determine that the mobile station notifies the base station of the exit from the power save mode whenever a power save (PS) poll message or a trigger message of a Wireless Fidelity (WiFi) multimedia power save (WMM PS) mode is received from the mobile station. The releasing controller may check an Internet Protocol (IP) address of the mobile station transmitting the PS poll message or the trigger message of a WMM PS mode, and routes only a packet having the same IP address as the destination IP address of the mobile station among buffered packets to the mobile station.

A fourth aspect of the present invention provides a mobile station in a wireless LAN network, comprising a handoff controller for operating a handoff process from a first base station, which is currently connected to the mobile station, to a second base station, to which the mobile station performs handoff, and a memory for storing address information of the first and second base stations and the mobile station.

The handoff controller may comprise a scanning module for performing a scanning process to search for the second base station among base stations around the mobile station where the scanning module notifies the first base station of an entry into a power save mode, a probing module for performing a probing process together with the second base station searched through the scanning process where the probing module notifies the first base station of an exit from the power save mode, and a link establishment module for establishing a link with the second base station where the link establishment module notifies the second base station of an entry into a power save mode and closing a connection with the first base station. The link establishment module may notify the second base station of an exit from the power save mode after closing the connection with the first base station.

The memory may comprise a base station (BS) information database for storing information of the first and the second base stations.

BRIEF DESCRIPTION OF THE DRAWINGS

A more complete appreciation of the invention, and many of the attendant advantages thereof, will be readily apparent as the same becomes better understood by reference to the following detailed description, when considered in conjunction with the accompanying drawings, in which like reference symbols indicate like components, wherein.

DETAILED DESCRIPTION OF THE INVENTION

Hereinafter, exemplary embodiments of the present invention will be described in detail with reference to the accompanying drawings. In the following description, a detailed description of known functions and configurations incorporated herein has been omitted for conciseness. The following description will be made regarding exemplary embodiments in which the present invention is applied to a wireless local area network (LAN) network and a mobile station, base station and method of controlling handoff in the wireless LAN network. It should be noted that the following exemplary embodiments are merely to help with understanding the present invention, and thus are not to be interpreted as limiting the scope of the present invention.

Figure 2:
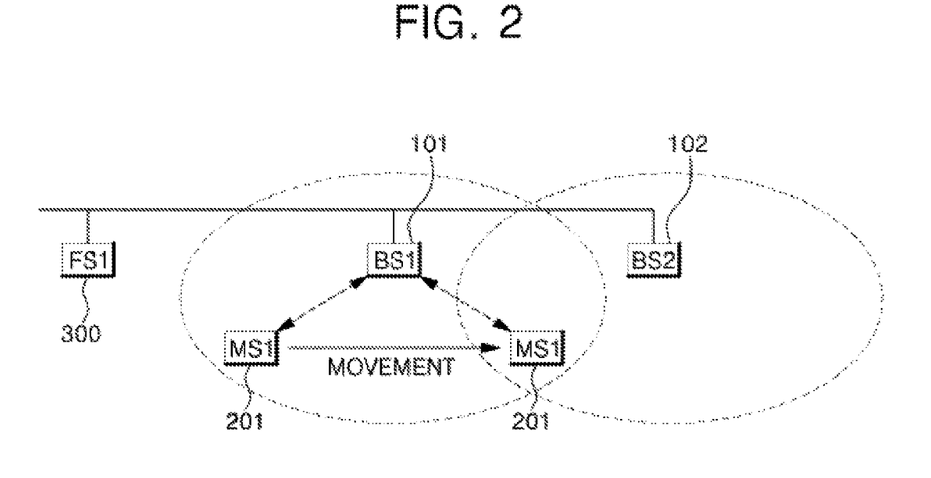
FIG. 2 is a block diagram of a wireless LAN network according to an exemplary embodiment of the present invention.

FIG. 2 is a block diagram of a wireless LAN network according to an exemplary embodiment of the present invention. Referring to FIG. 2, the wireless LAN network comprises base stations (BS) 101 and 102 and a mobile station (MS) 201, and also may include a fixed station (FS) 300 used in an Ethernet environment. Here, the base stations 101 and 102 denote access points (APs) of a wireless LAN network, etc., and the mobile station 201 denotes a wireless LAN (WLAN) mobile terminal.

In FIG. 2, the mobile station 201 is currently in connection with the first base station 101 and moves to an area where both signals from the first and second base stations 101 and 102 can be received. As the mobile station 201 moves, the mobile station 201 must perform handoff from the first base station 101 to the second base station 102. The present invention is aimed at preventing packet loss during a process of performing the handoff.

To this end, upon starting the handoff process, the mobile station 201 transmits a message notifying that the mobile station 201 enters a power-save mode to the first base station 101. The first base station 101 buffers a packet that is to be transmitted to the mobile station 201 after receiving the power-save mode entry message from the mobile station 201.

Although the mobile station 201 requests for entry into the power-save mode as mentioned above, it enters the power-save mode in association with only the first base station 101 and actually performs a negotiation process with the second base station 102 without entering the power-save mode.

After the negotiation process with the second base station 102, the mobile station 201 must perform a process of closing (or terminating) the connection with the first base station 101. Also in this case, the mobile terminal 201 transmits a predetermined message notifying that the mobile station 201 enters the power-save mode to the second base station 102. The second base station 102 buffers a packet from the time that the power-save mode entry message is received from the mobile station 201 until a connection closing process between the mobile station 201 and the first base station 101 is completed.

Meanwhile, the first and second base stations 101 and 102 must transmit the buffered packets to the mobile station 201. Such a packet forwarding process may start when the mobile station 201 transmits a predetermined message notifying that the mobile station 201 exits from the power-save mode.

A process of buffering a packet and transmitting the buffered packet between the base stations 101 and 102 and the mobile station 201 will be described below in detail using messages used in the wireless LAN network.

Figure 3:
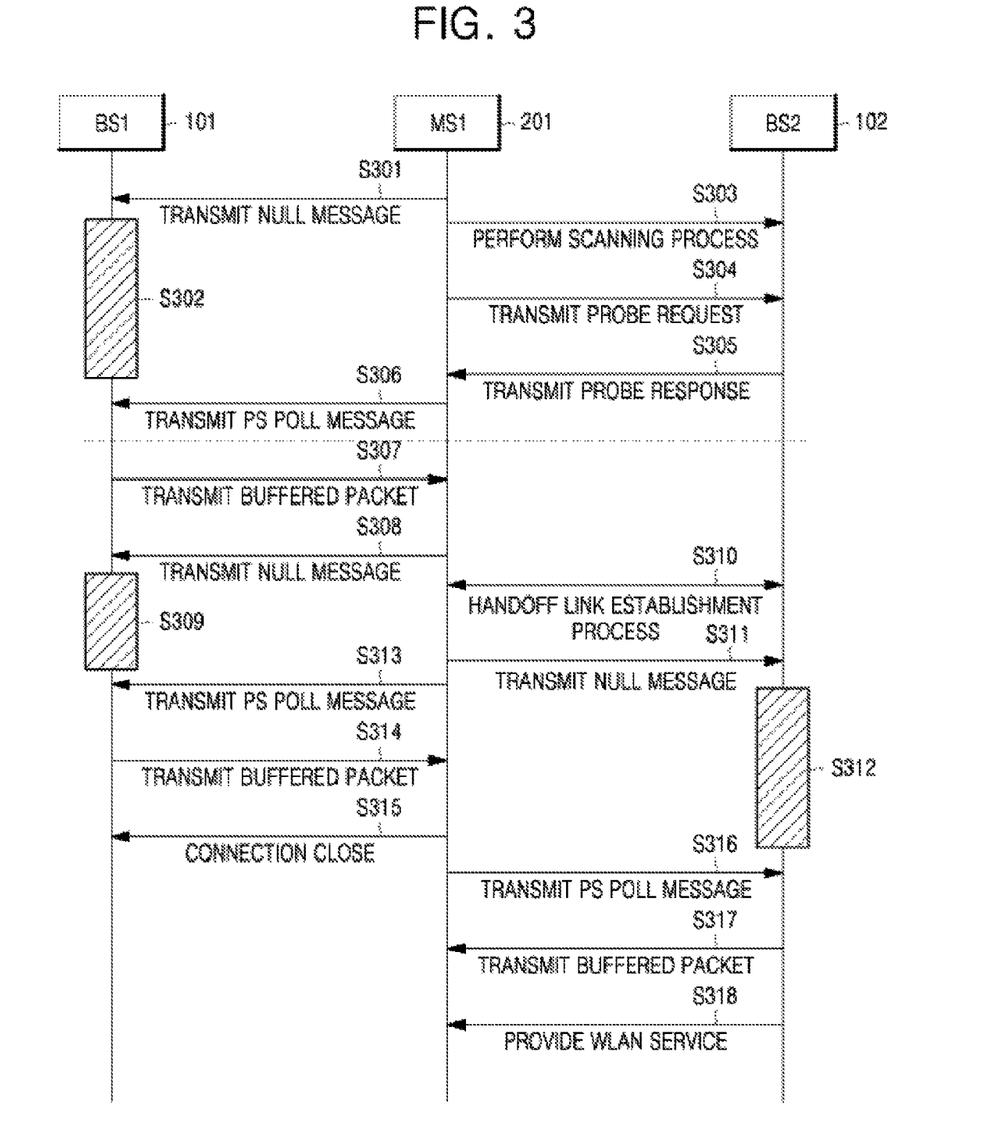
FIG. 3 is a flowchart showing a method of controlling handoff in a wireless LAN network according to an exemplary embodiment of the present invention.

FIG. 3 is a flowchart showing a method of controlling handoff in a wireless LAN network according to an exemplary embodiment of the present invention.

The mobile station 201 transmits a null message to the first base station 101 to notify of entry into the power-save mode (step S301). The first base station 101 receiving the null message starts buffering a packet to be transmitted to the mobile station 201 (step S302). After transmitting the null message, the mobile station 201 performs a scanning process of searching for an adjacent base station to which the mobile station 201 performs handoff (step S303). If the scanning process fails, there is no adjacent base station to which the mobile station 201 performs handoff. It is not necessary for this case to be considered in the present invention.

If a new base station, i.e., the second base station 102, is found, the mobile station 201 transmits a probe request message to the second base station 102 (step S304), and the second base station 102 transmits a probe response message in response to the probe request message (step S305). The processes from the steps S303 to S305 can be referred to as a handoff initiation process.

After transmission and reception of the probe messages, the mobile station 201 transmits a power-save (PS) poll message to the first base station 101 (step S306). The first base station 101 receiving the PS poll message transmits the packet, which is buffered during the scanning and probing processes, to the mobile station 201 (step S307).

In addition, after completing reception of the buffered packet triggered by the PS poll message, the mobile station 201 starts a handoff negotiation process with the second base station 102. To this end, the mobile station 201 must close a connection with the first base station 101 again for a while, and thus transmits a null message to the first base station 101 (step S308). As described in step S302, the first base station 101 determines that the mobile station 201 is currently in the power-save mode and buffers a packet to be transmitted to the mobile station 201 (step S309).

Meanwhile, the mobile station 201 performs a link establishment process together with the second base station 102 by using an authentication request message, an authentication response message, a reassociation request message, a reassociation response message, and so on (step S310). When such a link establishment process is completed, a packet to be transmitted from a public network to the mobile station 201 is transmitted to the second base station 102 other than the first base station 101.

Here, if the mobile station 201 immediately closes a connection with the second base station 102 to receive the buffered packet from the first base station 101, a packet transmitted to the second base station 102, while the mobile station 201 receives the buffered packet, is lost.

In order to prevent the packet loss, the mobile station 201 may first transmit a null message to the second base station 102 before receiving the buffered packet from the first base station 101 (step S311). The second base station 102 determines that the mobile station 201 enters the power-save mode, and buffers a packet to be transmitted to the mobile station 201 until a PS poll message is received (step S312).

Meanwhile, the mobile station 201 transmits a PS poll message to the first base station 101 (step S313), and receives the packet buffered during the handoff negotiation process of the mobile station 201 (step S314). After transmission of the buffered packet is completed this way, the mobile station 201 transmits a disassociation message to the first base station 101 to completely close the link with the first base station 101 (step S315).

Finally, the mobile station 201 transmits a PS poll message to the second base station 102 (step S316), and receives the packet buffered in step 312 (step S317). After reception of the buffered packet is completed this way, the mobile station 201 receives a packet transmitted from the public network through the second base station 102 (step S318). In other words, the mobile station 201 receives wireless LAN service through the second base station 102.

Figure 4:
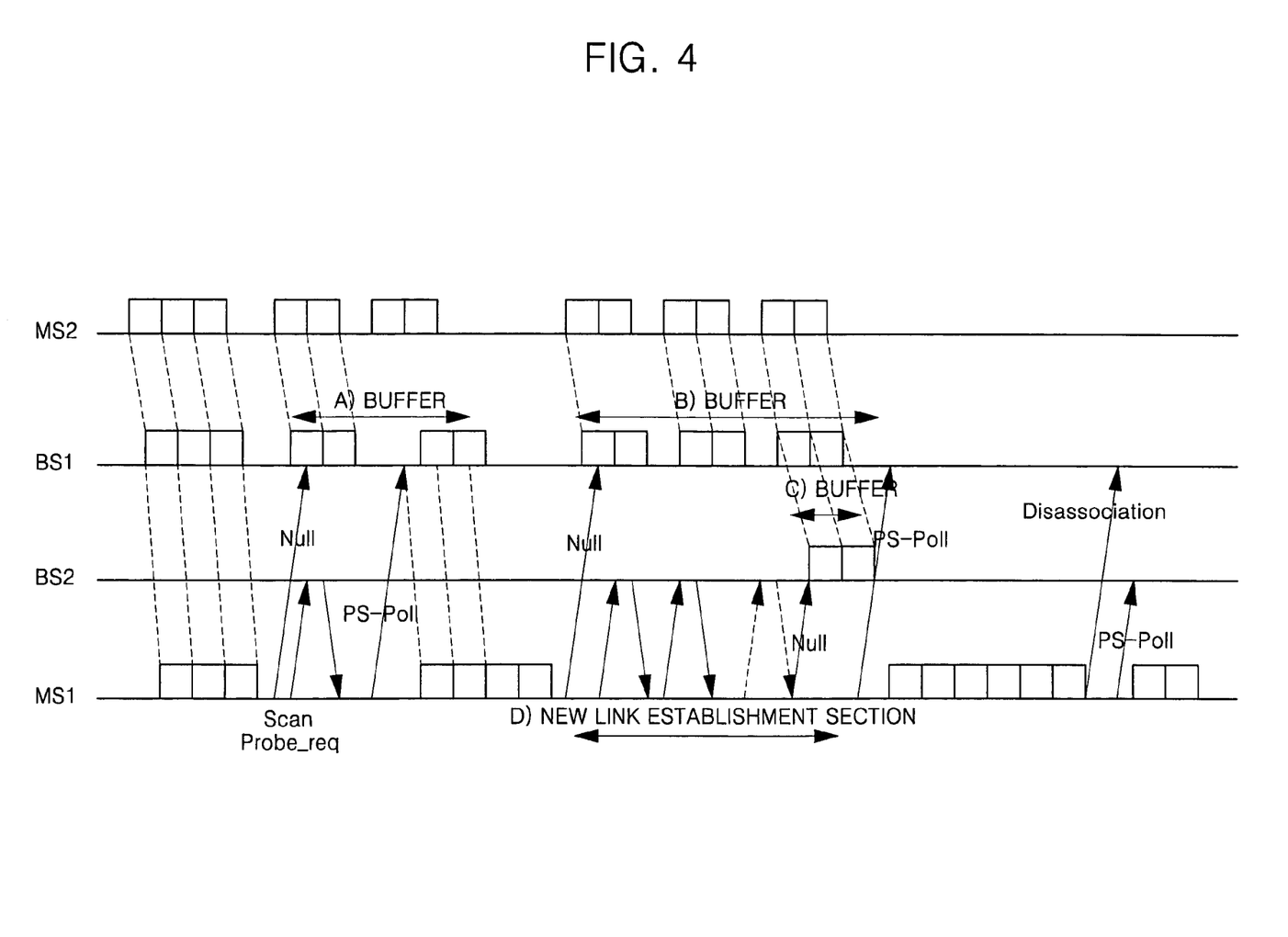
FIG. 4 illustrates a packet transmission result based on a method of controlling handoff in a wireless LAN network according to an exemplary embodiment of the present invention.

FIG. 4 illustrates a packet transmission result based on a method of controlling handoff in a wireless LAN network according to an exemplary embodiment of the present invention. As illustrated in FIG. 4, a packet to be transmitted to a mobile station MS1 is buffered during a scanning process and a probing process, that is, in the section of A) BUFFER of a first base station BS1, and is transmitted to the first mobile station MS1 after a PS poll message is transmitted.

In addition, a packet to be transmitted to the mobile station MS1 during a process of establishing a new link, that is, in the section of B) BUFFER, is buffered in the first base station BS1, and a packet to be transmitted to the mobile station MS1 in the section of C) BUFFER is buffered in a second base station BS2. Since the packets buffered in sections B) and C) are also transmitted to the mobile station MS1 after another PS poll message is transmitted, the packets to be transmitted to the mobile station MS1, which are buffered in these sections, are not lost.

Figure 5:
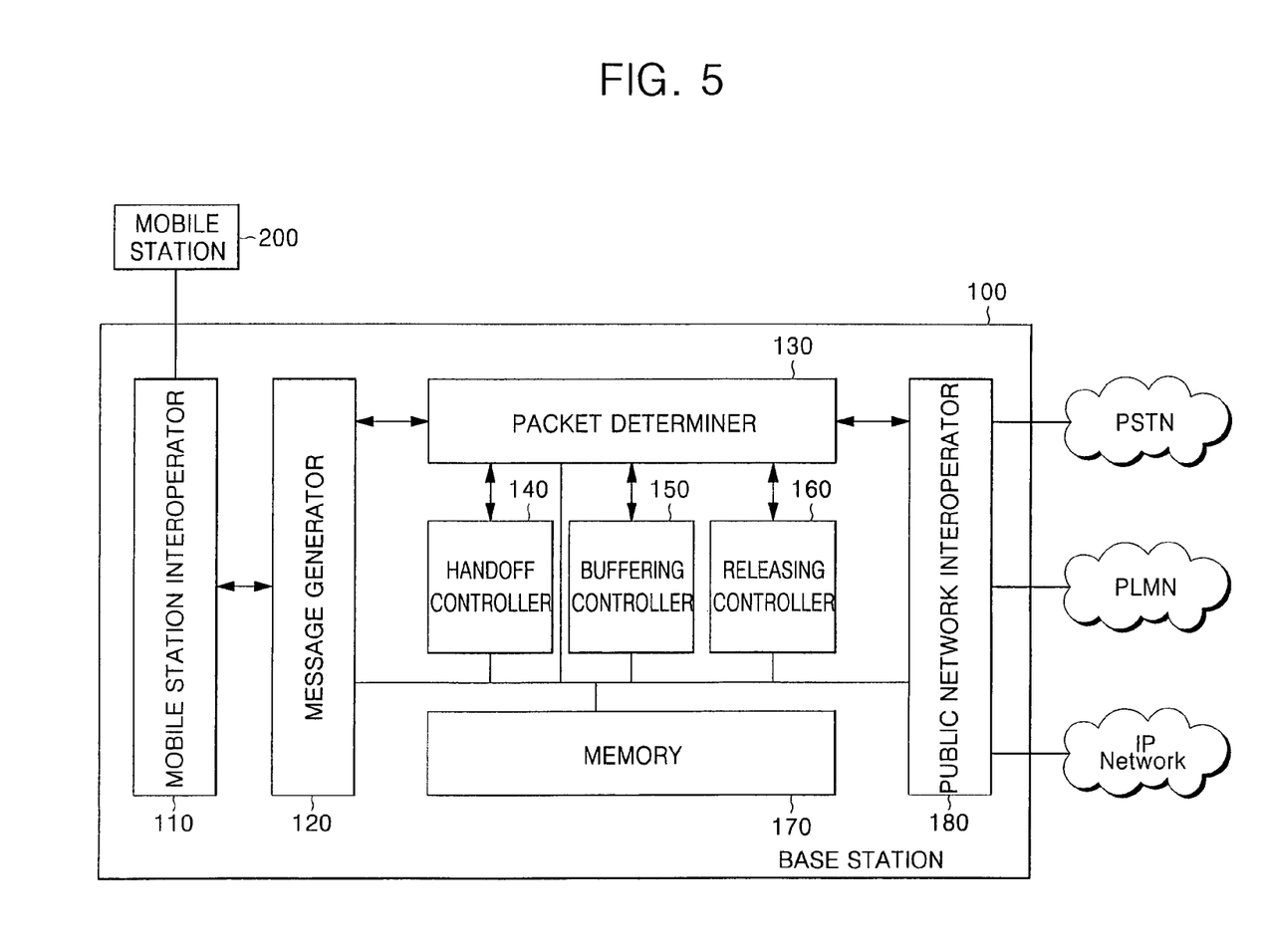
FIG. 5 is a block diagram of a base station according to an exemplary embodiment of the present invention.

FIG. 5 is a block diagram of a base station constructed as an exemplary embodiment of the present invention. As illustrated in FIG. 5, a base station 100 comprises a mobile station interoperator 110, a message generator 120, a packet determiner 130, a handoff controller 140, a buffering controller 150, a releasing controller 160, a memory 170, a public network interoperator 180.

The mobile station interoperator 110 physically transmits and receives a packet to and from a mobile station 200 wirelessly or through a wire. The mobile station interoperator 110 is a first gateway that transmits a data packet or a control frame to the mobile station 200, or that receives a null message, a PS poll message or a trigger message from the mobile station 200.

The public network interoperator 180 transmits and receives data to and from a public land mobile network (PLMN), the Internet, a public switched telephone network (PSTN), and so on. The public network interoperator 180 receives a packet from the public networks and transmits it to the packet determiner 130.

The packet determiner 130 checks what kind of packet the mobile station interoperator 110 or the public network interoperator 180 receives, and transfers the packet to a component for processing the packet according to the check result.

In particular, the packet determiner 130 determines whether a packet received from the mobile station 200 is a null message, a PS poll message, or a trigger message of a wireless fidelity (WiFi) multimedia power-save (WMM PS) mode. The packet determiner 130 activates the buffering controller 150 when the base station 100 receives a null message, and activates the releasing controller 160 when the base station 100 receives a PS poll message or a trigger message.

When the packet determiner 130 activates the buffering controller 150 or the releasing controller 160, it simultaneously transfers, as a parameter, information of the mobile station 200 that have transmitted the null message, the PS poll message or the trigger message.

The buffering controller 150 is activated by the packet determiner 130. The activated buffering controller 150 controls a packet to be buffered in the memory 170, wherein the packet is transmitted through the public network interoperator 180 to the mobile station having transmitted the null message. This may be implemented by certain methods, whereby the buffering controller 150 requests the packet determiner 130 to transfer the packet transmitted to the mobile station 200 having transmitted the null message to the memory 170, and so on. In particular, the buffering controller 150 checks an Internet protocol (IP) address of a mobile station existing in a null message, and controls a packet to be buffered, the packet having the same destination IP address as the IP address of the mobile station among packets transmitted from a public network.

On the other hand, when the releasing controller 160 is activated by the packet determiner 130, it serves to release and transmit a packet stored in the memory 170 to the mobile station 200 having transmitted the PS poll message or the trigger message.

This may be implemented by the releasing controller 160, which reads data from the memory 170 and transfers the read data to the message generator 120. In particular, the releasing controller 160 checks an IP address of a mobile station, which have transmitted a PS poll message or a trigger message of the WMM PS mode, and transfers only a packet having the same destination IP address as the IP address of the mobile station among buffered packets to the message generator 120.

Meanwhile, the handoff controller 140 performs a handoff negotiation process with the mobile station 200 through an authentication process of an authentication request message received from the mobile station 200 and a reply process of a reassociation message. Since a method of performing the handoff negotiation process is similar to a conventional method, a detailed description thereof will be omitted.

The message generator 120 generates a message to be transmitted to the mobile station 200. For example, the message generator 120 receives data that the releasing controller 160 reads from the memory 170, generates a message conforming to a wireless LAN regulation, and transfers the message to the mobile station interoperator 110.

The message generator 120 also generates a message conforming to a wireless LAN regulation from data to be transmitted from the public network interoperator 180 to a general mobile station not performing handoff, and so on.

Figure 6:
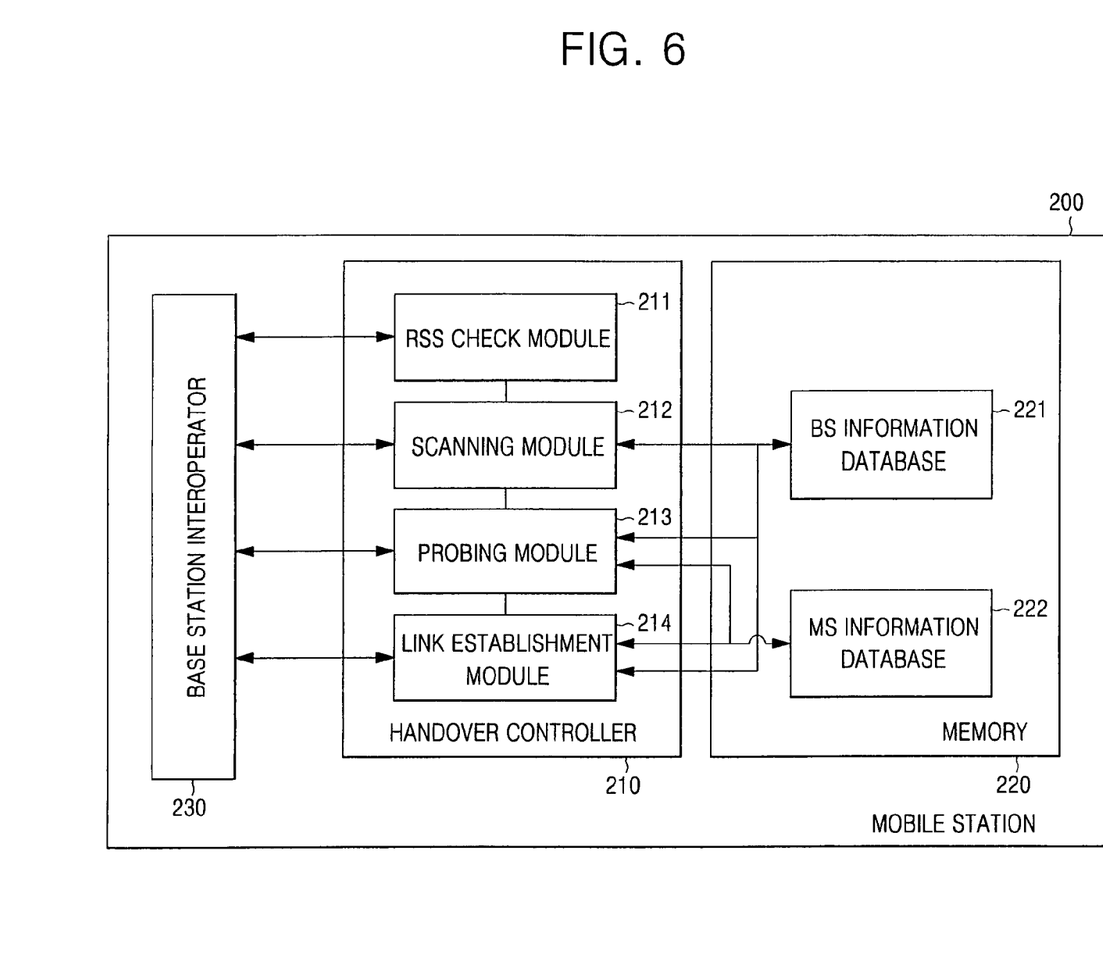
FIG. 6 is a block diagram of a mobile station according to an exemplary embodiment of the present invention.

FIG. 6 is a block diagram of a mobile station constructed as an exemplary embodiment of the present invention. As illustrated in FIG. 6, a mobile station 200 comprises a handoff controller 210, a memory 220 and a base station interoperator 230. The mobile station 200 may further include a user interface, other applications, etc., but the additional components are omitted to clearly describe the present invention.

The base station interoperator 230 physically transmits and receives a packet to and from base stations 100 wirelessly or through a wire. In the present invention, the base station interoperator 230 may receive a data packet or a control frame from the base stations 100, or transmit a null message, a PS poll message, or a trigger message to the base stations 100.

The handoff controller 210 includes a received signal strength (RSS) check module 211, a scanning module 212, a probing module 213, a link establishment module 214, and so on.

The RSS check module 211 checks whether an RSS from the currently connected base station 101 becomes a predetermined value or less, and activates the scanning module 212.

The scanning module 212 serves to search for the base stations, such as an access point, around the mobile station 200. The mobile station 200 can perform handoff to one of the base stations detected by scanning. However, the scanning module 212 of the present invention performs scanning after transmitting a null message to the currently connected base station 101.

The probing module 213 performs a probing process together with the base station 102 detected through the scanning process. The probing module 213 transmits a probe request message to a base station to which the mobile station 200 can perform handoff, and receives a probe response message in response to the probe request message, thereby performing the probing process. In particular, the probing module 213 of an exemplary embodiment of the present invention transmits a PS poll message or a trigger message defined in the WMM PS mode to the base station 101, to which the scanning module 212 transmits a null message after terminating the probing process.

The link establishment module 214 performs a process of establishing a new link with the base station 102 to which the mobile station 200 performs handoff, after the probing process. Such a link establishment process includes a process of transmitting and receiving authentication request/response messages and reassociation request/response messages.

However, before a negotiation process starts, the link establishment module 214 of an exemplary embodiment of the present invention transmits a null message to a base station 101 from which the mobile station 200 performs handoff. In addition, after the negotiation process is completed, the link establishment module 214 transmits a null message to a base station 102 to which the mobile station 200 performs handoff, and then transmits a PS poll message, etc., to the base station 101 again. The link establishment module 214 receives all buffered packets from the base station 101, and then notifies the base station 101 of close of connection and transmits a PS poll message to the base station 102.

As described above, a mobile station suggested by the present invention cannot simultaneously perform communication with two base stations. However, the mobile station has a characteristic in which it performs a handoff process together with a second base station while notifying a first base station of entry into the power-save mode. In other words, the mobile station performs a multi-station operation to connect with a plurality of base stations.

To this end, the memory 220 of the mobile station 200 may include a base station (BS) information database 221 and a mobile station (MS) information database 222. The MS information database 222 stores information of mobile stations, and the BS information database 221 stores information of base stations, to and from which the mobile station 200 performs handoff.

In the BS information database 221, information of base stations, to and from which the mobile station 200 performs handoff, is stored. In other words, according to the exemplary embodiment of FIG. 3, the mobile station 201 stores information of the first and second base stations 101 and 102 in the BS information database 221. In addition, the mobile station 201 refers to the information stored in the BS information database 221 to transmit a message to one of the two base stations 101 and 102.

Figure 7:
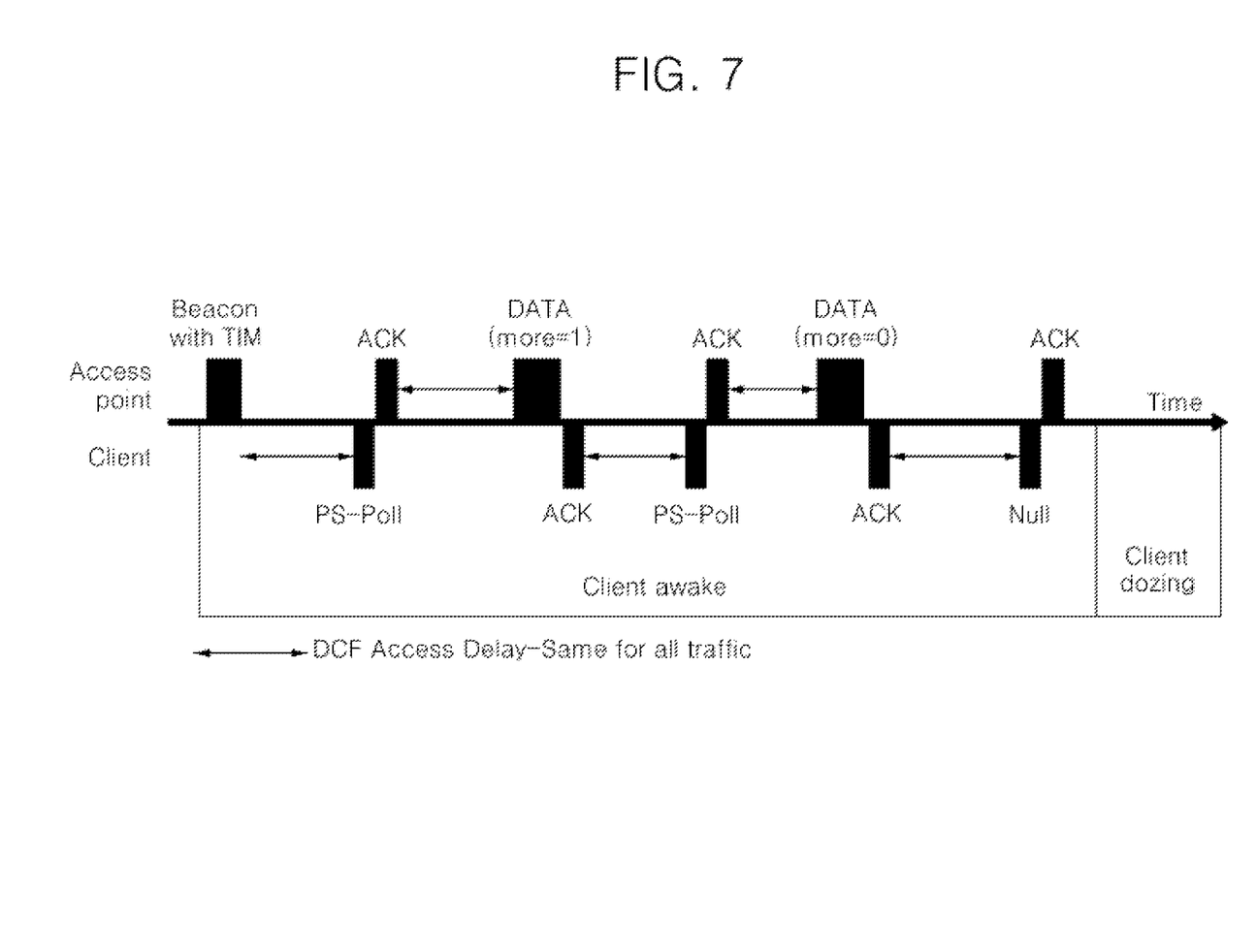
FIG. 7 illustrates use of a Power-Save (PS) poll message for handoff in a wireless LAN network according to the present invention.

FIG. 7 illustrates use of a PS poll message used for handoff in a wireless LAN network according to the present invention. In FIG. 3, the method of performing a seamless handoff process using a PS poll message is illustrated. Here, a general method of using a PS poll message in the present invention and an application of the PS poll message will be described.

After a beacon message including traffic indication map (TIM) information of a base station is transmitted, a PS poll message is transmitted from a mobile station to the base station. Association identification (AID), which is identification (ID) of a mobile station that receives a frame during the corresponding period, exists in the TIM information of the beacon message.

When the ID of the mobile station is included in the TIM information, the mobile station transmits a PS poll message to the base station, and an acknowledgement (ACK) process of the PS poll message is performed. After such a predetermined negotiation process, the base station transmits data to the mobile station.

The base station transmits data to the mobile station, and when there is remaining data to be transmitted, sets a field of MoreFlag to 1, and transmits the remaining data. The mobile station receiving the data transmitted from the base station responds with an ACK message, and after a fixed distributed coordination function (DCF) access delay time, transmits a PS poll message requesting for next data to the base station.

Data transmission is repeated through the process. Here, when the base station transmits final data, it sets the field of MoreFlag to 0, and transmits the data to the mobile station. The mobile station receiving a packet having the MoreFlag set to 0 transmits an ACK message for acknowledging the reception of the packet and transmits a null message notifying of entry into the power-save mode to the base station.

The base station receiving the null message notifying entry into the power-save mode responds with an ACK message, and the mobile station enters the power-save move at this point in time.

In the present invention, after transmitting the null message, the mobile station does not enter the power-save mode but scans another base station to which it performs handoff, performs a handoff negotiation process, and so on.

Meanwhile, the base station receiving the null message buffers a packet to be transmitted to the mobile station. When receiving a PS poll message from the mobile terminal, the base station transmits the buffered packet to the mobile station.

Figure 8:
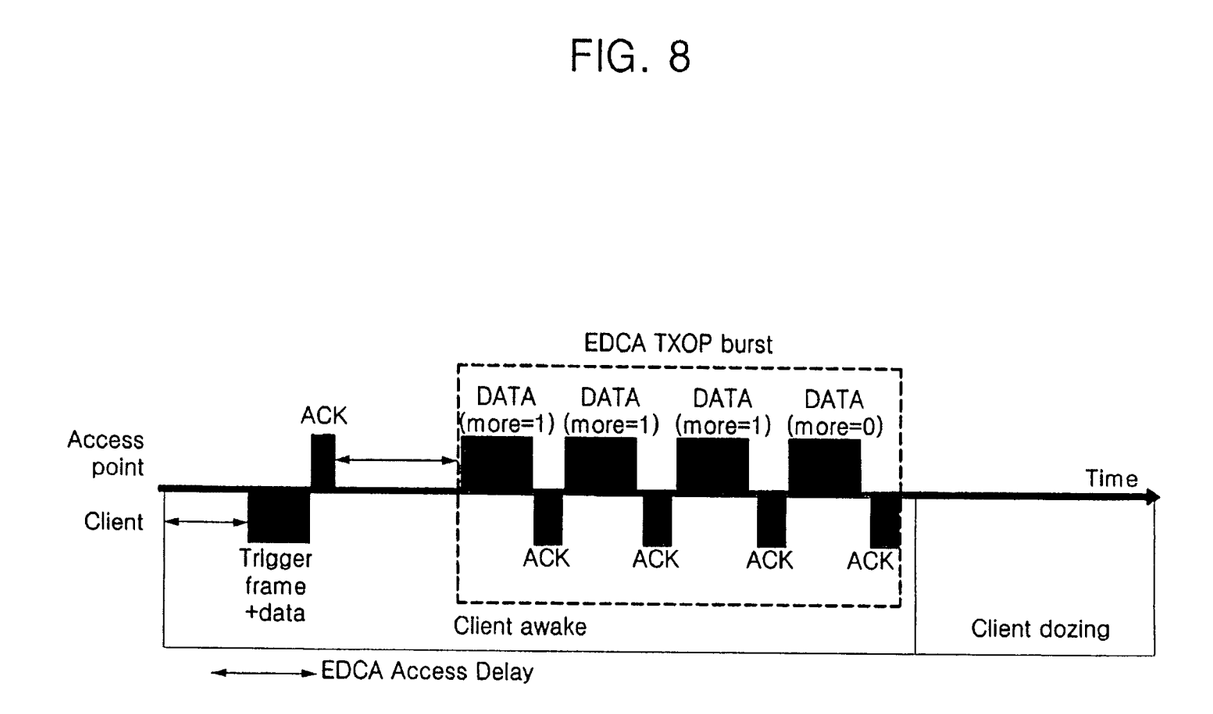
FIG. 8 illustrates use of a Wireless Fidelity (WiFi) Multimedia Power-Save (WMM PS) mode for handoff in a wireless LAN network according to the present invention.

FIG. 8 illustrates use of a WMM PS mode for handoff in a wireless LAN network according to the present invention.

Thus far, the method of performing seamless handoff using a PS poll message has been described with reference to FIGS. 3 and 7. However, the present invention can apply the WMM PS mode for seamless handoff. A general WMM PS mode and an application of the general WMM PS mode will be described below.

In the WMM PS mode, data transmission and reception are triggered by a trigger frame of a mobile station. When a mobile station transmits a trigger frame to a base station, the base station transmits an ACK message in response to the trigger frame.

The base station transmits data after a predetermined enhanced distribution channel access (EDCA) access delay time. In the WMM PS mode, in comparison with a data transmission and reception method using a PS poll message, data can be immediately transmitted and received without delay between data packets.

Referring to FIG. 8, only data and ACK messages are transmitted in an EDCA transmission opportunity (TXOP) burst section. When there is remaining data to be transmitted, a base station sets a MoreFlag field to 1 as described with reference to FIG. 7, and transmits the data to a mobile station. When there is the final data to be transmitted, the base station sets a MoreFlag field to 0, and transmits the data to the mobile station. In response to the data, the mobile station transmits an ACK message and then enters the power-save mode.

To apply the WMM PS mode in the present invention, a mobile station transmits a null message to a base station, and the base station buffers a packet to be transmitted to the mobile station that has transmitted the null message. Meanwhile, to receive the buffered packet, the mobile station transmits a trigger frame to the base station.

As described above, according to the inventive system and method for controlling handoff using the power-save mode of a mobile station, a previously connected base station buffers a packet to transmit to a mobile station while the mobile station performs handoff to another base station, and transmits the buffered packet to the mobile station when the base station is notified of exit from the power-save mode by the mobile station after the handoff process. Consequently, it is possible to perform handoff without packet loss.

While the present invention has been described with reference to exemplary embodiments thereof, it will be understood by those skilled in the art that various changes in from and detail may be made therein without departing from the scope of the present invention as defined by the following claims.

What is claimed is:

1. A wireless local area network (LAN) network, comprising:
a plurality of base stations; and
a mobile station to notify a first base station of the base stations of a first entry into a power-save mode, the mobile station to perform a handoff initiation process with a second base station of the base stations to which the mobile station performs handoff, the mobile station to notify the first base station of a first exit from the power-save mode in response to completing the handoff initiation process, the first base station to buffer a packet that is to be transmitted to the mobile station through the first base station in response to the first base station being notified of the first entry into the power-save mode by the mobile station, the first base station to transmit the buffered packet to the mobile station in response to the first base station being notified of the first exit from the power-save mode by the mobile station, the second base station to buffer a second packet that is to be transmitted to the mobile station through the second base station in response to the second base station being notified of a second entry into the power-save mode by the mobile station, the second base station to transmit the buffered second packet to the mobile station in response to the second base station being notified of a second exit from the power-save mode by the mobile station,
wherein the handoff initiation process comprises the mobile station being configured to send a probe request message to the second base station and to receive a probe response message from the second base station, after notifying the first base station of the first entry into the power-save mode, and
wherein the mobile station is configured to establish a handoff link in response to notifying the first base station of a third entry into the power-save mode.

2. The wireless LAN network of claim 1, wherein the mobile station is configured to transmit a null message to notify the first base station of the first entry into the power-save mode.

3. The wireless LAN network of claim 1, wherein the mobile station is configured to transmit a power-save (PS) poll message or a trigger message of a Wireless Fidelity (WiFi) multimedia power-save (WMM PS) mode to notify the first base station of the first exit from the power-save mode.

4. The wireless LAN network of claim 1, wherein the mobile station is configured to scan the base stations to search for the second base station during the handoff initiation process, and the mobile station is configured to establish the handoff link with the second base station after completing the handoff initiation process.

5. The wireless LAN network of claim 4, wherein the mobile station is configured to notify the second base station of the second entry into the power-save mode after establishing the new link with the second base station.

6. A method of controlling handoff in a wireless local area network (LAN) network, comprising:

notifying, by a mobile station, a first base station of a first entry into a power-save mode;
buffering, in the first base station, a first packet to be transmitted to the mobile station through the first base station;
performing, at the mobile station, a handoff initiation process with a second base station to which the mobile station performs handoff;
notifying, by the mobile station, the first base station of a first exit from the power-save mode;
transmitting the first packet from the first base station to the mobile station;
notifying, by the mobile station, the first base station of a second entry into the power-save mode; and
establishing, by the mobile station, a handoff link with the second base station in response to notifying the first base station of the second entry into the power-save mode,
wherein performing the handoff initiation process comprises:
transmitting, by the mobile station to the second base station, a probe request message after notifying the first base station of the first entry into the power-save mode; and
receiving, by the mobile station from the second base station, a probe response message in response to the probe request message.

7. The method of claim 6, wherein notifying the first base station of the first entry into the power-save mode comprises transmitting a null message to the first base station.

8. The method of claim 6, wherein notifying the first base station of the first exit from the power-save mode comprises transmitting a power-save (PS) poll message or a trigger message of a Wireless Fidelity (WiFi) multimedia power-save (WMM PS) mode to the first base station.

9. The method of claim 6, wherein performing the handoff initiation process to a second base station comprises scanning base stations to search for the second base station to which the mobile station performs handoff.

10. The method of claim 6, further comprising:
notifying, by the mobile station, the first base station of the second entry into the power-save mode;
buffering, in the first base station, a second packet to be transmitted to the mobile station through the first base station;
establishing, by the mobile station, the handoff link with the second base station;
notifying, by the mobile station, the second base station of an entry into a power-save mode associated with the second base station;
buffering, in the second base station, a packet to be transmitted to the mobile station through the second base station;
notifying, by the mobile station, the first base station of a second exit from the power-save mode;
transmitting the second packet from the first base station to the mobile station; closing the connection with the first base station;
notifying, by the mobile station, the second base station of an exit from the power-save mode associated with the second base station; and
transmitting the packet buffered in the second base station from the second base station to the mobile station.

11. A base station in a wireless local area network (LAN) network, comprising:
a packet determiner to determine whether a notification of an entry into or an exit from a power-save mode is received from a mobile station that is located in an area managed by the base station;

a buffering controller to control a packet to be transmitted to the mobile station, the buffering controller to buffer the packet in response to the packet determiner being notified of the entry into the power-save mode by the mobile station;

a releasing controller to release the buffered packet to the mobile station in response to the packet determiner being notified of the exit from the power-save mode by the mobile station; and a handoff controller to perform a handoff negotiation process with the mobile station after the mobile station transmits a message notifying entry of the mobile station into the power-save mode to another base station, and to perform a handoff link establishment process with the mobile station after the mobile station retransmits the message to the another base station, wherein the handoff negotiation process comprises receiving a request message from the mobile station, and transmitting a response message to the mobile station in response to the request message.

12. The base station of claim 11, wherein the packet determiner is configured to determine that the mobile station notifies the base station of the entry into the power-save mode with the base station in response to a null message being received from the mobile station.

13. The base station of claim 12, wherein the buffering controller is configured to check an Internet Protocol (IP) address of the mobile station transmitting the null message, and to buffer a packet having a destination IP address comprising the IP address of the mobile station.

14. The base station of claim 11, wherein the packet determiner is configured to determine that the mobile station notifies the base station of the exit from the power-save mode with the base station in response to receiving a power-save (PS) poll message or a trigger message of a Wireless Fidelity (WiFi) multimedia power-save (WMM PS) mode from the mobile station.

15. The base station of claim 14, wherein the releasing controller is configured to check an Internet Protocol (IP) address of the mobile station transmitting the PS poll message or the trigger message of a WMM PS mode, and to route only a packet having a destination IP address that is the IP address of the mobile station, among buffered packets to the mobile station.

16. A mobile station in a wireless local area network (LAN) network, comprising:

a handover controller to control a handoff process from a first base station connected to the mobile station, to a second base station, to which the mobile station performs handoff to; and a memory to store address information of the first base station, the second base station, and the mobile station, wherein the handover controller comprises:

a scanning module to send a message notifying entry of the mobile station into a power-save mode to the first base station and to perform a scanning process to search for the second base station among base stations located around the mobile station;

a probing module to send a probe request message to the second base station in response to the scanning module performing the scanning process, and to receive a probe response message from the second base station, after the message is sent; and a link establishment module to resend the message to the first base station and to establish a link with the second base station after resending the message.

17. The mobile station of claim 16, wherein:

the scanning module is configured to notify the first base station of a first entry into the power-save mode;

the probing module is configured to notify the first base station of an exit from the power-save mode; and the link establishment module is configured to notify the second base station of an entry into a power-save mode associated with the second base station and to close a connection with the first base station.

18. The mobile station of claim 17, wherein the link establishment module is configured to notify the second base station of an exit from the power-save mode associated with the second base station after closing the connection with the first base station.

19. The mobile station of claim 16, wherein the memory comprises:

a base station (BS) information database to store information of the first base station and the second base station.

* * * * *